Patented Jan. 29, 1952

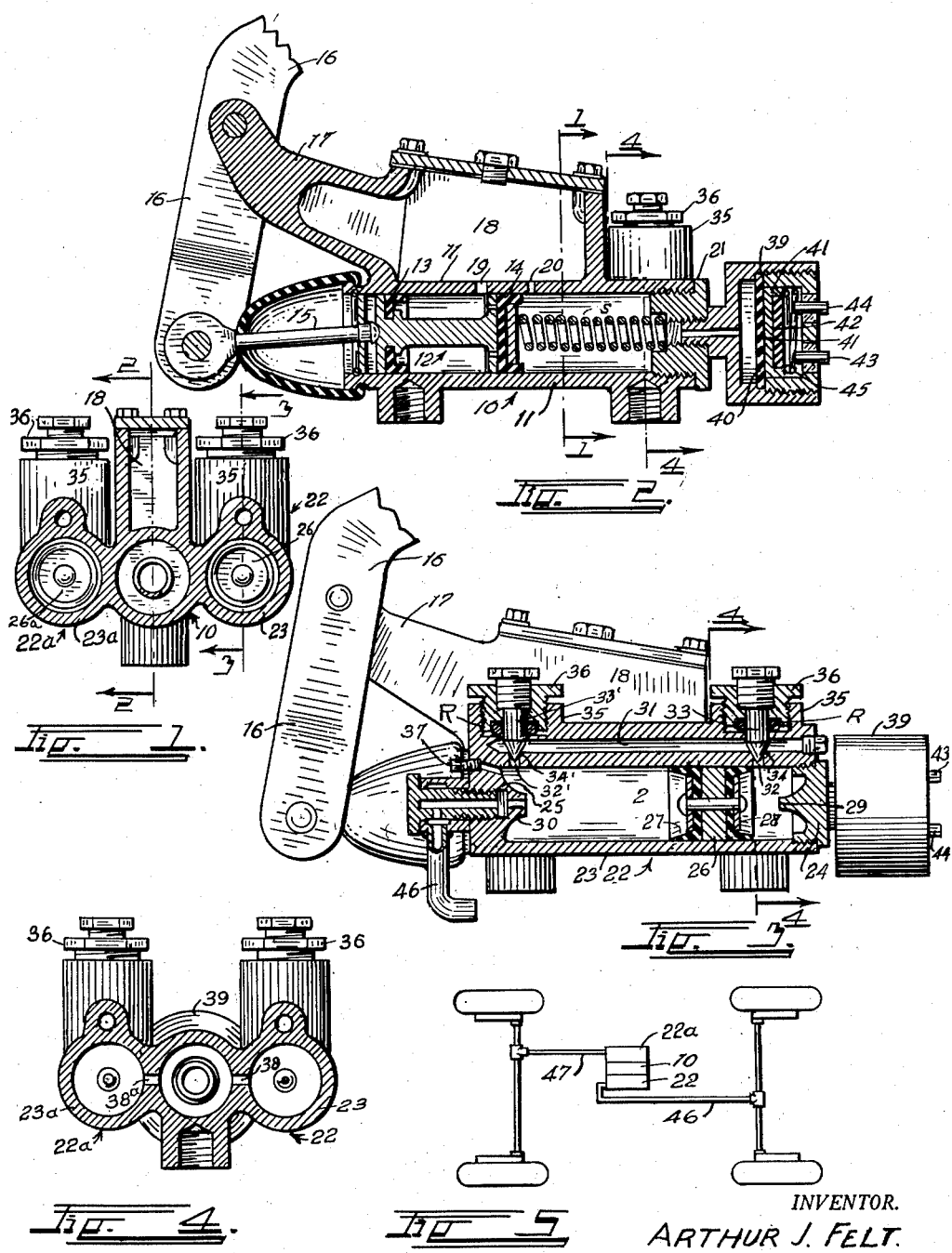

2,583,825

UNITED STATES PATENT OFFICE 2,583,825

HYDRAULIC BRAKE SAFETY DEVICE

Arthur J. Felt, Littleton, Colo.

Application February 23, 1950, Serial No. 145,769

3 Claims. (Cl. 60—54.5)

This invention relates to improvements in safety devices for automotive hydraulic brake systems.

Present hydraulic brake systems comprise a master cylinder which delivers fluid to a plurality of cylinders disposed adjacent the wheels of the vehicle, and if no safety devices are provided, all brakes fail if one of the liquid lines ruptures. Certain safety devices have been proposed to prevent complete failure of the braking system when this occurs, but so far as is known, have not met with any substantial commercial success.

One of the objects of the present invention is to provide a master cylinder having safety devices formed integral therewith which may replace, as a unit, present master cylinders, or be employed in their stead, as original equipment of motor vehicles.

Another object is to construct the safety devices in such manner that air may not enter the system when the brake pedal is suddenly released.

A further object is to provide improved by-pass means between the ends of the safety devices.

Still further objects, advantages, and salient features will become more apparent from a consideration of the description to follow, the appended claims, and the accompanying drawing, in which:

Figure 1 is a transverse section taken on line 1—1, Figure 2;

Figure 2 is a longitudinal section taken on line 2—2, Figure 1;

Figure 3 is a longitudinal section taken on line 3—3, Figure 1;

Figure 4 is a transverse section taken on line 4—4, Figures 2 and 3; and

Figure 5 is a diagrammatic view of the entire brake system.

Referring in detail to the drawing, the master cylinder 10 comprises a cylinder wall 11 having a piston 12 therein, this piston having synthetic rubber cup washers 13, 14, and being actuated by a link 15 connected to a brake pedal 16 pivotally supported by a bracket 17. A reservoir 18 is disposed above the master cylinder and communicates therewith by ports 19, 20. A spring S is disposed between cup washer 13 and plug 21 urging the former to the left as viewed in Figure 2. The construction so far described is conventional and well-known in the art.

A pair of safety devices 22, 22a comprising cylinders 23, 23a, respectively, are disposed parallel to the master cylinder on opposite sides thereof, these cylinders, the master cylinder, the reservoir and the pedal bracket all being formed as an integral casting. The safety devices 22, 22a are identical, hence the description of one will serve for both.

Cylinder 23 of safety device 22 is closed at one end by a plug 24 and at the other end by an integral wall 25. A piston 26 having cup washers 27, 28 secured thereto is slidably disposed within the bore of the cylinder. Abutments 29, 30, are provided on plug 24 and wall 25, respectively, which prevent the free edges of the cup washers from contacting and being damaged by the wall and plug. A by-pass passage 31 communicates opposite ends of the cylinder through ports 32, 32' which are normally closed by needle valves 33, 33' seating on seats 34, 34'. Since the by-pass needle valves are identical the description of one will serve for all four. The stem of valve 33 extends through a boss 35 which is provided with a pack nut 36 which threadedly engages the valve stem and the boss, an O ring R being disposed around the valve stem and being compressible by the pack nut as shown in Figure 3.

Plug 25 is provided with a plug 37 which may be removed or loosened to bleed air from the system. Ports 38, 38a (see Figure 4) communicate the right ends (Figures 2 and 3) of cylinders 23, 23a with master cylinder 10.

A stop light switch 39 threadedly engages plug 21 and contains a diaphragm 40 which urges insulating disk 41, which carries a metallic contact 42, to the right, the latter contact bridging insulated contacts 43, 44, thus establishing a circuit to the stop light when the pedal 16 is depressed. A suitable spring 45 urges the contact disk to the left when the pedal is released.

When the device is installed pistons 26, 26a are moved to the extreme right (Figure 3) in their respective cylinders. The by-pass valves are opened and fluid is supplied to the various wheel cylinders by pumping pedal 16, suitable air bleeding being effected at the wheel cylinders as is understood in the art. When the system has been filled with liquid and all air bled therefrom the by-pass valves are all closed. The pistons 26, 26a remain disposed at the right ends of their respective cylinders.

When the pedal is depressed in operation liquid is forced through ports 38, 38a into the safety device cylinders which moves the pistons therein to the left (Figure 3) transmitting pressure to the liquid between the wheel cylinders and the pistons. As shown in Figure 5, one of the safety devices is connected to both front wheels by conduit 46 and the other connected to both rear wheels by conduit 47. In event conduit 46 or 47 (or a downstream conduit connected thereto) should rupture one of pistons 26 or 26a will be forced to the extreme left when the pedal is actuated. This renders the brakes on a pair of wheels, either front or rear, inoperative but the other pair remains operative. Braking will thus be equalized on both sides of the vehicle. When the ruptured conduit has been repaired, the piston will, of course, be manually returned to its original position at the right end of its cylinder.

It will be observed that pistons 26, 26a float in their cylinders without any spring urge in either direction. This is important because if spring urged to the right, as has been proposed in prior art devices, a sudden release of the brake pedal will effect a rapid movement of the pistons under urge of their springs which creates a suction at the wheel cylinders thus drawing air past their sealing cups and into the system. The system, of course, must remain free of air at all times if the brakes are to function properly.

It will also be observed that when the by-pass valves are in their normally closed position there is no pressure on their packings and hence no tendency to leak by same. When open during filling of the system the pressure in passage 31 is only slightly above atmospheric pressure, hence the tendency to leak is small at such time that the packings perform their intended function.

Since the safety devices are integral with the master cylinder they may be formed in the same casting operation. In machining, they may be simultaneously bored with the master cylinder and require only several additional machining operations normally not involved in machining the conventional master cylinder. This construction reduces the cost of manufacture over a construction wherein the safety devices are formed separately and connected by conduits to a conventional master cylinder. Additionally, the present construction has the advantage that less connecting conduits are required which minimizes points at which conduit failure may occur. The integral construction and ports 38, 38a, for example, eliminate any possible failure between the master cylinder and the safety devices. If any leakage occurs at plugs 24, the reservoir automatically refills the master cylinder, thus this possible leakage has no effect on the liquid between pistons 26, 26a and the wheel cylinders. By constructing walls 25 integral with the safety cylinders no leakage may occur between the former and the latter.

Having described the invention, what I claim as new is:

1. A hydraulic brake actuating device comprising; a master cylinder adapted for horizontal operation, having a reservoir disposed thereabove and a brake pedal bracket thereon projecting beyond the end of the master cylinder, the master cylinder, reservoir, and bracket being formed as an integral casting, a piston in the master cylinder, means comprising a brake pedal pivotally supported by the bracket for moving the piston in the master cylinder, a pair of safety cylinders, one disposed on each side of the master cylinder and parallel thereto, said safety cylinders being cast integral with the master cylinder, portions of the master cylinder walls forming common portions of the safety cylinder walls, a port extending through each common wall portion communicating one end of said master cylinder farthest from the brake pedal with corresponding ends of the safety cylinders, and a piston in each safety cylinder, the safety cylinder pistons being movable in the opposite direction to the piston in the master cylinder when the latter piston is actuated, the walls of the safety cylinders each having a valve controlled passage communicating opposite ends of the interior.

2. A device in accordance with claim 1 in which the safety cylinders have two valves for closing the passage, one near each end of the passage.

3. A device in accordance with claim 1 wherein the safety cylinders are disposed relative to the master cylinder so that the pistons in the safety cylinders move parallel to the piston in the master cylinder but in the opposite direction to the latter.

ARTHUR J. FELT.

REFERENCES CITED

The following references are of record in the file of this patent:

UNITED STATES PATENTS

| Number | Name | Date |
|---|---|---|
| 1,443,219 | Frock | Jan. 23, 1923 |
| 1,652,232 | Blasdel | Dec. 13, 1927 |
| 1,986,763 | Rhodes | Jan. 1, 1935 |
| 2,056,940 | Francis | Oct. 13, 1936 |
| 2,104,909 | Rykaczewski | Jan. 11, 1938 |
| 2,119,001 | Bachmann | May 31, 1938 |
| 2,123,102 | Feigley | July 5, 1938 |
| 2,203,908 | Hess | June 11, 1940 |
| 2,239,348 | Wirtanen | Apr. 22, 1941 |
| 2,249,227 | Press | July 15, 1941 |

FOREIGN PATENTS

| Number | Country | Date |
|---|---|---|
| 504,278 | Great Britain | Apr. 19, 1939 |